United States Patent
Ellig et al.

(10) Patent No.: US 9,637,699 B2
(45) Date of Patent: May 2, 2017

(54) METHODS FOR PROCESSING NITROGEN RICH RENEWABLE FEEDSTOCKS

(71) Applicant: UOP LLC, Des Plaines, IL (US)

(72) Inventors: Daniel Ellig, Arlington Heights, IL (US); Donald A. Eizenga, Elk Grove Village, IL (US)

(73) Assignee: UOP LLC, Des Plaines, IL (US)

( * ) Notice: Subject to any disclaimer, the term of this patent is extended or adjusted under 35 U.S.C. 154(b) by 241 days.

(21) Appl. No.: 14/674,298

(22) Filed: Mar. 31, 2015

(65) Prior Publication Data

US 2016/0289136 A1    Oct. 6, 2016

(51) Int. Cl.
| | | |
|---|---|---|
| C10L 10/16 | (2006.01) | |
| C10G 45/58 | (2006.01) | |
| C10G 3/00 | (2006.01) | |

(52) U.S. Cl.
CPC ............... *C10L 10/16* (2013.01); *C10G 3/50* (2013.01); *C10G 45/58* (2013.01); *C10G 2400/04* (2013.01); *C10L 2270/026* (2013.01)

(58) Field of Classification Search
None
See application file for complete search history.

(56) References Cited

U.S. PATENT DOCUMENTS

| | | | |
|---|---|---|---|
| 8,318,996 B2 | 11/2012 | Murty et al. | |
| 8,523,959 B2 | 9/2013 | O'Rear | |
| 8,546,626 B2 | 10/2013 | Daudin et al. | |
| 8,581,013 B2 | 11/2013 | Abhari et al. | |
| 8,609,912 B2 | 12/2013 | Hanks et al. | |
| 8,623,102 B2 | 1/2014 | Quignard et al. | |
| 8,629,308 B2 | 1/2014 | Abhari et al. | |
| 8,822,744 B2 | 9/2014 | Mizan et al. | |
| 2009/0294324 A1* | 12/2009 | Brandvold ............... | C10L 1/04 208/17 |
| 2011/0099891 A1 | 5/2011 | Kaul et al. | |
| 2012/0116138 A1 | 5/2012 | Goodall et al. | |
| 2013/0030229 A1 | 1/2013 | Myllyoja et al. | |
| 2013/0261360 A1 | 10/2013 | Eizenga et al. | |
| 2013/0305591 A1* | 11/2013 | McCall ................... | C10G 45/58 44/300 |
| 2013/0317268 A1 | 11/2013 | Bozzano et al. | |

(Continued)

OTHER PUBLICATIONS

Kim et al., "Hydrothermal catalytic conversion of waste vegetable oil to liquid hydrocarbon fuel . . . ", ACS National Meeting Book of Abstracts (2013), 246th conference.

(Continued)

*Primary Examiner* — Tam M Nguyen

(57) ABSTRACT

Processes for producing a fuel from a renewable feedstock which may have more than 60 ppm nitrogen. The renewable feedstock is passed to a deoxygenation zone. A hydrogen stream, preferably formed from a recycled gas, is introduced into the deoxygenation zone at a relatively high rate. The hydrogen introduction may be between 3 to 5 times the rate of hydrogen consumption in the deoxygenation zone. The hydrogen introduction may also be between 6000 to 9000 SCF/BBL. A deoxygenated effluent, comprising less than 1 wppm nitrogen, may be isomerized and separated into one or more product hydrocarbon streams such as a diesel fuel or aviation fuel.

20 Claims, 1 Drawing Sheet

(56) References Cited

U.S. PATENT DOCUMENTS

2014/0187827 A1* 7/2014 Abdallah ................ C10G 3/46
585/14
2014/0296590 A1* 10/2014 Luebke ................... C10G 3/52
585/310

OTHER PUBLICATIONS

Toosi et al., "Simulation of a non-isothermal industrial hydrotreating reactor using simulink" Energy & Fuels (2014), 28(7), 4828-4834.

* cited by examiner

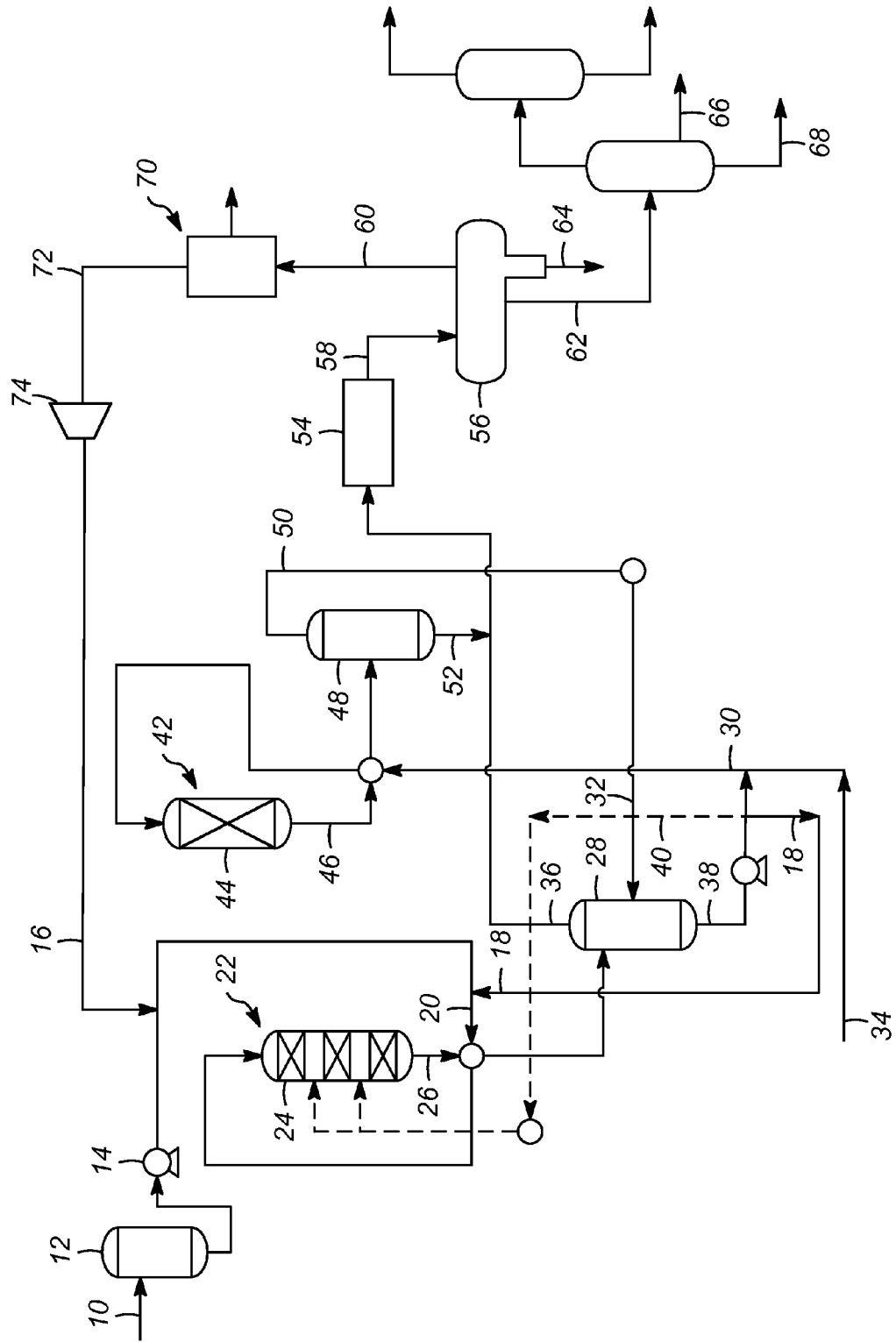

METHODS FOR PROCESSING NITROGEN RICH RENEWABLE FEEDSTOCKS

FIELD OF THE INVENTION

This invention relates generally to the processing of renewable feedstocks, and more particularly to processing renewable feedstocks which have an increased nitrogen content.

BACKGROUND OF THE INVENTION

As the demand for diesel and jet boiling range fuel increases worldwide, there is increasing interest in feedstock sources other than petroleum crude oil. One such source is what has been termed "renewable" and "biological" feedstocks. These renewable biological feedstocks include, but are not limited to, plant oils such as corn, jatropha, camelina, rapeseed, canola, and soybean oil, algal oils, and animal fats such as tallow and fish oils. The common feature of these sources is that they are composed of glycerides and Free Fatty Acids (FFAs). Both of these classes of compounds contain normal aliphatic carbon chains having from about 8 to about 24 carbon atoms. The aliphatic carbon chains in the glycerides or FFAs can be fully saturated or mono, di- or poly-unsaturated. The sidechains of the glycerides and the FFAs in biological oils and fats can be converted into diesel or jet fuel using many different processes, such as hydrodeoxygenation and hydroisomerization processes.

Fuel processed from renewable biological sources is desirable for a variety of reasons. Foremost, the use of renewable biological-sourced fuels reduces the demand for the extraction and use of fossil fuels. This is especially true for transportation fuels such as diesel and jet fuel. In addition to the ecological benefits of using biological-sourced fuel, there exists a market demand for such fuel. For fuel purchasers, the use of biological-sourced fuel can be promoted in public relations. Also, certain governmental policies may require or reward use of biological-sourced fuels.

However, renewable biological feedstocks present challenges in processing. Some renewable feedstocks are high in nitrogen (e.g. low grade animal fats—packer tallows) and therefore more difficult to process in the first stage deoxygenation step. Organic nitrogen conversion to ammonia is a competing reaction to the necessary deoxygenation reaction. These high nitrogen feeds are generally cheaper in the market place. However, processing the cheaper feeds may be more expensive and costly. Thus, they may not represent a real commercial value.

Therefore, there is a need for processes that can effectively and efficiently convert renewable biological feedstocks, especially feedstocks high in nitrogen, into linear hydrocarbons for the production of fuels such as diesel and jet fuel.

SUMMARY OF THE INVENTION

One or more processes have been invented in which the hydrogen recycle gas rate to the deoxygenation zone is increased compared to conventional operation conditions. Surprisingly and unexpectedly, it was discovered that by increasing the recycle hydrogen gas rate in the deoxygenation zone, those feedstocks that are high in nitrogen may be effectively and efficiently converted.

Therefore, in a first aspect of the present invention, the present invention may be broadly characterized as providing a process for converting a renewable feedstock into a fuel by: deoxygenating a renewable feedstock in the presence of hydrogen in a deoxygenation zone comprising a catalyst and being operated under conditions to provide a deoxygenated effluent; introducing hydrogen to the deoxygenation zone at a rate of between 6000 to 9000 SCF/BBL; and, isomerizing the deoxygenated effluent in an isomerization zone comprising a catalyst and being operated under conditions to improve at least one cold flow property of the deoxygenated effluent stream in an isomerized effluent.

In at least one embodiment of the present invention, the deoxygenated effluent comprises less than 1 wppm of nitrogen.

In one or more embodiments of the present invention, the deoxygenated effluent comprises less than 100 wppb of nitrogen.

In some embodiments of the present invention, the rate of hydrogen introduction is between 7000 to 8000 SCF/BBL. It is contemplated that the deoxygenation zone and the isomerization zone are contained within different reactors.

In various embodiments of the present invention, the renewable feedstock comprises >60 ppm nitrogen. It is also contemplated that the renewable feedstock comprises >100 ppm nitrogen.

In at least one embodiment of the present invention, the rate of hydrogen introduction is between approximately three to five times a rate of hydrogen consumption in the deoxygenation zone.

In one or more embodiments of the present invention, the hydrogen introduced into the deoxygenation zone comprises a hydrogen containing gas comprising between 75-85% hydrogen.

In a second aspect of the present invention, the present invention may be broadly characterized as providing a process for converting a renewable feedstock into a fuel product by: passing a renewable feedstock to a deoxygenation zone comprising a catalyst and being operated under conditions to provide a deoxygenated effluent; introducing a hydrogen containing gas to the deoxygenation zone such that a rate of hydrogen introduction is between approximately three to five times a rate of hydrogen consumption in the deoxygenation zone; deoxygenating the renewable feedstock in the deoxygenation zone to provide a deoxygenated effluent; and, isomerizing the deoxygenated effluent in an isomerization zone comprising a catalyst and being operated under conditions to improve at least one cold flow property of the deoxygenated effluent stream in an isomerized effluent.

In one or more embodiments of the present invention, the hydrogen containing gas introduced into the deoxygenation zone comprises between 75-85% hydrogen.

In at least one embodiment of the present invention, the renewable feedstock comprises >60 ppm nitrogen.

In some embodiments of the present invention, the rate of hydrogen introduction is between 6000 to 9000 SCF/BBL. It is contemplated that a pressure in the deoxygenation zone is between 3.45 and 6.89 MPa (500 and 1000 psig). It is also contemplated that the rate of hydrogen introduction is between 7000 and 8000 SCF/BBL. It is further contemplated that the renewable feedstock comprises >60 ppm and the deoxygenated effluent comprises less than 100 wppb of nitrogen. In various embodiments of the present invention, the renewable feedstock comprises >60 ppm and the deoxygenated effluent comprises less than 1 wppm of nitrogen. It is contemplated that the rate of hydrogen introduction is approximately 4 times the rate of hydrogen consumption in the deoxygenation zone.

In various embodiments of the present invention, the deoxygenation zone and the isomerization zone are contained within different reactors.

In one or more embodiments of the present invention, the process also includes passing the isomerized effluent to a separation zone to provide at least one transportation fuel stream and at least one gas stream, the gas stream including hydrogen, and the transportation fuel stream comprising a diesel fuel stream, and compressing at least a portion of the gas stream from the separation zone to provide at least a portion of the hydrogen containing gas injected into the deoxygenation zone.

Additional aspects, embodiments, and details of the invention are set forth in the following detailed description of the invention.

DETAILED DESCRIPTION OF THE DRAWINGS

One or more exemplary embodiments of the present invention will be described below in conjunction with the following drawing figure, in which:

The FIGURE shows a process flow diagram according to one or more embodiments of the present invention.

DETAILED DESCRIPTION OF THE INVENTION

As mentioned above, it has been discovered that by increasing the rate of the recycle hydrogen gas to the deoxygenation zone, high nitrogen feedstocks may be effectively and efficiently converted. While the prior art has suggested broad ranges for the hydrogen gas rate, the prior art has failed to recognize the impact the hydrogen gas injection rate has for a nitrogen rich feedstock.

With these general principles in mind, one or more embodiments of the present invention will be described with the understanding that the following description is not intended to be limiting.

As shown in the FIGURE, one or more processes according to the present invention comprise the processing of a renewable feedstock 10 to produce a hydrocarbon product useful as a diesel or aviation fuel or blending component. The term renewable feedstock 10 is meant to include any of those which comprise glycerides, fatty acid alkyl esters (FAAE), and free fatty acids (FFA). Most of the glycerides will be triglycerides, but monoglycerides and diglycerides may be present and processed as well. Examples of these feedstocks include, but are not limited to, canola oil, corn oil, soy oils, rapeseed oil, soybean oil, colza oil, tall oil, sunflower oil, hempseed oil, olive oil, linseed oil, coconut oil, castor oil, peanut oil, palm oil, mustard oil, cottonseed oil, jatropha oil, ratanjoy oil, wild castor oil, jangli oil erandi oil, mohuwa oil, karanji honge oil, neem oil, inedible tallow, yellow and brown greases, lard, train oil, fats in milk, fish oil, algal oil, sewage sludge, cuphea oil, camelina oil, curcas oil, babassu oil, palm kernel oil, crambe oil, fatty acid methyl esters, lard, and the like, or any oil from a natural source or produced through microbial action. The glycerides, FAAEs and FFAs of the typical vegetable oil or animal fat contain aliphatic hydrocarbon chains in their structure which have about 8 to about 24 carbon atoms, with a majority of the fats and oils containing high concentrations of fatty acids with 16 and 18 carbon atoms.

Thus, the renewable feedstocks 10 that can be used in the processes contemplated herein include any of those which comprise glycerides, fatty acid alkyl esters (FAAE), and free fatty acids (FFA). In some embodiments, the renewable feedstock may be rich in nitrogen, meaning having greater than 100 ppm nitrogen, or in some embodiments greater than 60 ppm nitrogen.

The renewable feedstocks 10 used in the present invention may contain a variety of impurities. For example, tall oil contains esters and rosin acids in addition to FFAs. Rosin acids are cyclic carboxylic acids. The renewable feedstocks 10 may also contain contaminants such as alkali metals, e.g. sodium and potassium, alkali earth metals, e.g. calcium and magnesium, phosphorous, proteins, nitrogen, and sulfur, as well as solids, water, and detergents. An optional first step, not shown in the FIGURE, is to remove as much of these contaminants as possible. One possible pretreatment step involves contacting the renewable feedstock 10 with an ion-exchange resin in a pretreatment zone at pretreatment conditions. The ion-exchange resin, such as an acidic ion exchange resin, can be used as a bed in a reactor through which the renewable feedstock 10 is flowed, either as upflow or downflow. Another pretreatment technique includes contacting the renewable feedstock 10 with a bleaching earth, such as bentonite clay, in a pretreatment zone.

Another possible means for removing contaminants is a mild acid wash. This may be carried out by contacting the renewable feedstock 10 with an acid such as sulfuric, nitric, phosphoric, citric, or hydrochloric acid in a reactor. The acid and renewable feedstock 10 can be contacted either in a batch or continuous process. Contacting is done with a dilute acid solution usually at ambient temperature and atmospheric pressure. If the contacting is done in a continuous manner, it is usually done in a counter-current manner.

Yet another possible means of removing metal contaminants from the renewable feedstock 10 is through the use of guard beds which are well known in the art. These can include alumina guard beds either with or without demetallation catalysts such as nickel or cobalt. Filtration and solvent extraction techniques are other choices that may be employed.

As shown in FIG. 1, in the processes according to the present invention, the renewable feedstock 10 may pass through an optional feed surge drum 12 and a pump 14, and be combined with a recycle gas stream 16 comprising between 75 to 85% hydrogen and a recycle hydrocarbon stream 18 (both discussed in more detail below) to form combined feed stream 20. The combined feed stream 20 may be heat exchanged with a reactor effluent (discussed below) and is then introduced into a deoxygenation reaction zone 22. Although not depicted as such, the heat exchanger may include a heater. The heat exchange may occur before or after the recycle hydrocarbon stream 18 is combined with the renewable feedstock 10.

The deoxygenation reaction zone 22 may comprise one or more reactors 24 each of which may contain multiple beds which contain at least one catalyst capable of catalyzing decarboxylation and/or hydrodeoxygenation of the renewable feedstock 10 to remove oxygen.

In an exemplary deoxygenation zone 22, renewable feedstock 10 is contacted with a catalyst in the presence of hydrogen at hydrogenation conditions to hydrogenate the olefinic or unsaturated portions of the aliphatic hydrocarbon chains. The catalysts are any of those well known in the art, such as nickel or nickel/molybdenum dispersed on a high surface area support. Other possible catalysts include one or more noble metal catalytic elements dispersed on a high surface area support. Non-limiting examples of noble metals include Pt and/or Pd dispersed on gamma-aluminas.

Hydrogenation conditions typically include a temperature of about 200 to about 450° C. (392 to 842° F.) and a pressure of at least about 3450 kPa (about 500 psi) to provide efficient deoxygenation; such as at least about 4140 kPa (about 600 psi), at least about 4820 kPa (about 700 psi), at least about 5520 kPa (about 800 psi), at least about 6890 kPa (about 1000 psi), at least about 8270 kPa (about 1200 psi), at least about 10340 kPa (about 1500 psi), or at least about 13790 kPa (about 2000 psi).

The catalysts enumerated above are also capable of catalyzing decarboxylation, decarbonylation, and/or hydrodeoxygenation of renewable feedstock 10 to remove oxygen. Decarboxylation, decarbonylation, and hydrodeoxygenation are herein collectively referred to as deoxygenation reactions.

Deoxygenation conditions include a temperature of about 200 to about 460° C. (392 to 860° F.), more preferably from about 288 to about 400° C. (550 to 752° F.). Since hydrogenation is an exothermic reaction, as the feedstock flows through the catalyst bed the temperature increases and decarboxylation, decarbonylation, and hydrodeoxygenation will occur. Although the hydrogenation reaction is exothermic, some feedstocks may be highly saturated and not generate enough heat internally, for example at startup. Therefore, some embodiments may require external heat input. It is contemplated that all the reactions occur simultaneously in one reactor or in one bed, however, typical operation will most likely utilize multiple beds, and possibly multiple reactors. Thus, the conditions can be controlled such that hydrogenation primarily occurs in one bed, and decarboxylation, decarbonylation, and/or hydrodeoxygenation occurs in a second or additional bed(s). If only one bed is used, it may be operated so that hydrogenation occurs primarily at the front of the bed, while decarboxylation, decarbonylation and hydrodeoxygenation occur mainly in the middle and back of the bed. Finally, desired hydrogenation can be carried out in one reactor, while decarboxylation, decarbonylation, and/or hydrodeoxygenation can be carried out in a separate reactor. However, the order of the reactions is not critical to the success of the process.

In addition to the removal of the oxygen via various reaction pathways, in the deoxygenation zone, nitrogen and sulfur can be removed from the renewable feedstock 10. More specifically, nitrogen may be removed via a denitrogenation reaction in which ammonia is formed. Additionally, sulfur may be removed via a desulfurization reaction in which hydrogen sulfide is formed. Finally, any metals in the renewable feedstock 10 can be removed via demetallization reactions.

A deoxygenation effluent stream 26, containing the products of the decarboxylation and/or hydrodeoxygenation reactions, is removed from deoxygenation reaction zone 22 and may be heat exchanged with the combined feed stream 20, as discussed above. The deoxygenation effluent stream 26 comprises a liquid component containing largely normal paraffin hydrocarbons in the diesel boiling range and a gaseous component containing largely hydrogen, vaporous water, carbon monoxide, carbon dioxide, ammonia, hydrogen sulfide, and propane.

The deoxygenation effluent stream 26 may be directed to a hot high pressure hydrogen stripper 28. In hot high pressure hydrogen stripper 28, the gaseous component of the deoxygenation reactor effluent 26 is selectively stripped from the liquid component of deoxygenation reactor effluent 26 using a hydrogen containing gas 32 (discussed below).

The dissolved gaseous component comprising hydrogen, vaporous water, carbon monoxide, carbon dioxide, ammonia, hydrogen sulfide, and at least a portion of the propane, is selectively separated into a hot high pressure hydrogen stripper overhead stream 36. The remaining liquid component of deoxygenation reactor effluent 26 comprises primarily normal paraffins having a carbon number from about 8 to about 24 with a cetane number of about 60 to about 100 and may be removed as a hot high pressure hydrogen stripper bottoms or a hydrocarbon fraction 38.

The recycle stream 18, may be taken as a portion of the hydrocarbon fraction 38. An optional stream 40 (shown in dashed lines) comprising another portion of the hydrocarbon fraction 38 may be routed directly to the deoxygenation reaction zone 24 and introduced in the deoxygenation reactor 24, such as between beds, in order, for example, to aid in temperature control. It is also contemplated to utilize a recycle gas stream for temperature control. The remainder of hydrocarbon fraction 38 from the hot high pressure hydrogen stripper 28 comprises essentially all normal paraffins, and thus, it will have poor cold flow properties. Many diesel and aviation fuels and blending components must have better cold flow properties. Accordingly, in various embodiments of the present invention, the hydrocarbon fraction 38 is passed to an isomerization zone 42.

More specifically, the hydrocarbon fraction 38 may be combined with a stream 34 of make-up hydrogen (which is typically high purity, i.e., 99.9% hydrogen) to form a combined isomerization feed stream 30, heat exchanged with an effluent stream (discussed below) and then passed to an isomerization reactor 44 in the isomerization zone 42. The isomerization reactor 44 in the isomerization zone is operated under conditions to isomerize at least a portion of the normal paraffins into branched paraffins including iso-paraffins.

In some embodiments, only minimal branching is required, enough to overcome cold flow problems of the normal paraffins. In other embodiments, a greater amount of isomerization is desired. The predominant isomerization product is generally a mono-branched hydrocarbon. Along with the isomerization, some hydrocracking of the hydrocarbons will occur. The more severe the conditions of the isomerization zone 42, the greater the amount of hydrocracking of the hydrocarbons. The hydrocracking occurring in the isomerization zone 42 results in a wider distribution of hydrocarbons than resulted from the deoxygenation zone 22. Further, increased levels of hydrocracking produces higher yields of hydrocarbons in the aviation fuel boiling range.

The isomerization of the paraffinic hydrocarbons in the isomerization zone 42 can be accomplished in any manner known in the art or by using any suitable catalyst known in the art. Suitable catalysts comprise a metal of Group VIII (IUPAC 8-10) of the Periodic Table and a support material. Suitable Group VIII metals include platinum and palladium, each of which may be used alone or in combination. The support material may be amorphous or crystalline. Suitable support materials include aluminas, amorphous aluminas, amorphous silica-aluminas, ferrierite, laumontite, cancrinite, offretite, hydrogen form of stillbite, magnesium or calcium form of mordenite, and magnesium or calcium form of partheite, each of which may be used alone or in combination. Many natural zeolites, such as ferrierite, that have an initially reduced pore size can be converted to forms suitable for olefin skeletal isomerization by removing associated alkali metal or alkaline earth metal by ammonium ion exchange and calcination to produce the substantially hydrogen form. The isomerization catalyst may also comprise a modifier selected from the group consisting of lanthanum, cerium, praseodymium, neodymium, samarium, gadolinium, terbium, and mixtures thereof.

The catalysts of the subject process can be formulated using industry standard techniques. It may be manufactured in the form of a cylindrical extrudate having a diameter of from about 0.8 mm to about 3.2 mm. The catalyst can be made in any other desired form such as a sphere or pellet. The extrudate may be in forms other than a cylinder such as the form of a well-known trilobe or other shape which has advantages in terms of reduced diffusional distance or pressure drop.

In general, isomerization conditions for the isomerization zone 42 include a temperature of about 150 to about 450° C. (302 to 842° F.), or between about 300 and about 400° C. (572 to 752° F.), or between about 300 and about 360° C. (572 to 680° F.). Typical isomerization pressures may be between about 2760 to about 6890 kPa (400 to 1000 psig), or in some embodiments between about 2760 to about 4820 kPa (400 to 700 psig). Other operating conditions for the isomerization zone are well known in the art, and the specific operating conditions used are predetermined and are dependent upon the desired product specifications and relative yields of the products.

The process severity in the isomerization zone 42 controls the potential yield of product for aviation fuel, the amount of light products that are not useful for diesel fuel or aviation fuel, and the isomerized/normal ratio of both aviation and diesel range fuel. Hydrocracking is controlled through catalyst choice and reaction conditions in an attempt to restrict the degree of hydrocracking. Ideally, each paraffin molecule would experience only a single hydrocracking event and ideally that single hydrocracking event would result in at least one paraffin in the $C_9$ to $C_{15}$ carbon number range. Careful choice of catalyst and control of the process conditions in the isomerization zone 42 may maximize paraffin products in the aviation fuel range while minimizing the production of the light paraffins, i.e., paraffins with carbon chains of 3 or fewer, which are not useful for either diesel fuel or aviation fuel applications.

It is noted that fuel specifications are typically not based upon carbon number ranges. Instead, the specifications for different types of fuels are often expressed through acceptable ranges of chemical and physical requirements of the fuel. For example, often a distillation range from 10 percent recovered to a final boiling point is used as a key parameter defining different types of fuels. The distillations ranges are typically measured by ASTM Test Method D86 or D2887. Blending of different components in order to meet the different specifications and requirements is quite common.

An isomerized effluent stream 46 from the isomerization zone 42 contains a gaseous portion of hydrogen and a branched-paraffin-enriched liquid portion. After an optional heat exchange with the combined isomerization feed stream 30 (discussed above), the isomerization effluent 46 may be introduced into a hydrogen separator 48. The hydrogen separator 48 forms an overhead stream 50 containing primarily hydrogen and bottom stream 52. The overhead stream 50 may be compressed and passed back to the hot high pressure hydrogen stripper 28 as the stripping gas 32 in the hot high pressure hydrogen stripper 28 (discussed above). The bottoms stream 52 from the hydrogen separation 48 may be combined with hot high pressure hydrogen stripper overhead stream 36, cooled using an air cooler 54 and then introduced into a product separator 56 as a cooled stream 58.

In the product separator 56, the gaseous portion of the cooled stream 58, comprising hydrogen, carbon monoxide, hydrogen sulfide, carbon dioxide and propane, will be removed in a vapor stream 60. A liquid hydrocarbon stream 62 may be removed from the product separator 56. A sour water byproduct stream 64 comprising ammonia and hydrogen sulfide is also removed from the product separator 56. The liquid hydrocarbon 62 may be passed to a separation zone having one or more fractionation columns which can separate the components of the hydrocarbon stream 62 into one or more product streams, such as a diesel stream 68 or an aviation fuel stream 66. The further processing of these streams is known and not necessary for an understanding of the present invention.

The vapor stream 60 from product separator 56 contains the gaseous portion of the reactor effluents comprising at least hydrogen, carbon monoxide, hydrogen sulfide, carbon dioxide and propane. As shown in the FIGURE, the vapor stream 60 is directed to a scrubbing zone 70. The scrubbing zone 70 may comprise an amine absorber capable of selectively removing carbon dioxide from the vapor stream 60. Exemplary suitable amines include a promoted or activated methyldiethanolamine (MDEA). Conditions for the scrubbing zone 70 include a temperature in the range of 30 to 60° C. (86 to 140° F.). The scrubbing zone 70 is operated at a temperature that is at least 1° C. (1.8° F.), preferably between about 2.8 to about 5.6° C. (5 to 10° F.), higher than that of the product separator 56. Keeping the scrubbing zone 70 warmer than the product separator 56 operates to maintain any light hydrocarbons, such as those having carbon chains of 3 or more carbons, in the vapor phase and prevents the light hydrocarbons from condensing into the absorber solvent.

In the scrubbing zone 70, carbon dioxide is absorbed by the amine while hydrogen passes there through and out of the scrubbing zone 70 as a cleaned gaseous stream 72. The cleaned gaseous stream, which may comprise between 75 to 85% hydrogen, may be passed to a compressor 74 and the output of the compressor 74 comprises the recycle gas stream 16 discussed at the outset which is injected into the deoxygenation reaction zone 22 via the combined stream 20.

Surprisingly, it has been found that introducing hydrogen into the deoxygenation zone at a rate that is relatively high, renewable feedstocks 10 that are high in nitrogen can be effectively converted into hydrocarbons. A renewable feedstock that is high in nitrogen comprises a feedstock that includes >60 ppm nitrogen, and in some embodiments a feedstock that includes >100 ppm nitrogen.

While the prior art discloses wide ranges of recycle gas rates, typically, operators choose to operate at the lowest possible rate to minimize the utility costs in operating the equipment such as a compressor which provide the recycle hydrogen gas. Additionally, the lower rate also allows for a lower capital cost associated with the compressor utilized, as a smaller, less expensive compressor can be utilized in the design. Accordingly, it has heretofore not been recognized that by utilizing a relatively high hydrogen introduction relative to the fresh feed (i.e., not including recycle liquid feed), for example in some embodiments a rate of between 6000 to 9000 SCF/BBL, or, in other embodiments, a rate of between 7000 to 8000 SCF/BBL, renewable feedstocks with a high nitrogen content can be effectively converted into hydrocarbons. In one or more embodiments, the rate of hydrogen introduction into the deoxygenation zone is between three to five times a rate of hydrogen consumption in the deoxygenation zone, or in some embodiments, at least four times the rate of hydrogen consumption in the deoxygenation zone. In one or more processes utilizing, one or more of the foregoing variables for the rate of hydrogen introduction, the deoxygenated effluent associated with a high nitrogen feedstock should comprise less than 1 wppm nitrogen, or less than 100 wppb nitrogen.

While it is possible to increase the pressure in the deoxygenation zone, or increase the amount of catalyst within the deoxygenation zone, both of these solutions require significant capital expenditures as well as increased operating costs. On the other hand, utilizing a relative high rate of hydrogen injection, which may be related to the rate of hydrogen consumption, is believed to provide the same ability to processes the high nitrogen feedstocks, without requiring such a large increase in capital and operating costs.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understating the embodiments of the present invention.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A process for converting a renewable feedstock into a fuel, the process comprising:
    deoxygenating a renewable feedstock in the presence of hydrogen in a deoxygenation zone comprising a catalyst and being operated under conditions to provide a deoxygenated effluent;
    introducing hydrogen to the deoxygenation zone at a rate of between 6000 to 9000 SCF/BBL; and,
    isomerizing the deoxygenated effluent in an isomerization zone comprising a catalyst and being operated under conditions to improve at least one cold flow property of the deoxygenated effluent in an isomerized effluent.

2. The process of claim 1 wherein the deoxygenated effluent comprises less than 1 wppm of nitrogen.

3. The process of claim 1 wherein the deoxygenated effluent comprises less than 100 wppb of nitrogen.

4. The process of claim 1 wherein the rate of hydrogen introduction is between 7000 to 8000 SCF/BBL.

5. The process of claim 4 wherein the deoxygenation zone and the isomerization zone are contained within different reactors.

6. The process of claim 1 wherein the renewable feedstock comprises >60 ppm nitrogen.

7. The process of claim 6 wherein the renewable feedstock comprises >100 ppm nitrogen.

8. The process of claim 1 wherein the rate of hydrogen introduction is between approximately three to five times a rate of hydrogen consumption in the deoxygenation zone.

9. The process of claim 1 wherein the hydrogen introduced into the deoxygenation zone comprises a hydrogen containing gas comprising between 75-85% hydrogen.

10. A process for converting a renewable feedstock into a fuel product, the process comprising:
    passing a renewable feedstock to a deoxygenation zone comprising a catalyst and being operated under conditions to provide a deoxygenated effluent;
    introducing a hydrogen containing gas to the deoxygenation zone such that a rate of hydrogen introduction is between approximately three to five times a rate of hydrogen consumption in the deoxygenation zone;
    deoxygenating the renewable feedstock in the deoxygenation zone to provide a deoxygenated effluent; and,
    isomerizing the deoxygenated effluent in an isomerization zone comprising a catalyst and being operated under conditions to improve at least one cold flow property of the deoxygenated effluent in an isomerized effluent.

11. The process of claim 10, wherein the hydrogen containing gas introduced into the deoxygenation zone comprises between 75-85% hydrogen.

12. The process of claim 10 wherein the renewable feedstock comprises >60 ppm nitrogen.

13. The process of claim 10 wherein the rate of hydrogen introduction is between 6000 to 9000 SCF/BBL.

14. The process of claim 13 wherein a pressure in the deoxygenation zone is between 3.45 and 6.89 MPa (500 and 1000 psig).

15. The process of claim 14 wherein the rate of hydrogen introduction is between 7000 and 8000 SCF/BBL.

16. The process of claim 15 wherein the renewable feedstock comprises >60 ppm and wherein deoxygenated effluent comprises less than 100 wppb of nitrogen.

17. The process of claim 10 wherein the renewable feedstock comprises >60 ppm and wherein deoxygenated effluent comprises less than 1 wppm of nitrogen.

18. The process of claim 17 wherein rate of hydrogen introduction is approximately 4 times the rate of hydrogen consumption in the deoxygenation zone.

19. The process of claim 10 wherein the deoxygenation zone and the isomerization zone are contained within different reactors.

20. The process of claim 10 further comprising:
    passing the isomerized effluent to a separation zone to provide at least one transportation fuel stream and at least one gas stream, the gas stream including hydrogen, and the transportation fuel stream comprising a diesel fuel stream; and,
    compressing at least a portion of the gas stream from the separation zone to provide at least a portion of the hydrogen containing gas injected into the deoxygenation zone.

* * * * *